United States Patent [19]

Matsumoto

[11] 3,983,276
[45] Sept. 28, 1976

[54] ADHESIVE TAPE
[75] Inventor: Yasuo Matsumoto, Minami-ashigara, Japan
[73] Assignee: Fuji Photo Film Co., Ltd., Minami-ashigara, Japan
[22] Filed: Oct. 30, 1975
[21] Appl. No.: 627,414

[30] Foreign Application Priority Data
Oct. 30, 1974 Japan.............................. 49-125034

[52] U.S. Cl.................................. 428/40; 428/334; 428/335; 428/336; 428/337; 428/352; 428/354; 428/412; 428/480; 428/523; 428/532; 428/900
[51] Int. Cl.²......................................... C09J 7/02
[58] Field of Search ........... 428/900, 352, 354, 343, 428/334–337, 40; 427/131

[56] References Cited
UNITED STATES PATENTS
2,912,344  11/1959  Newman et al................. 428/354 X
3,078,183  2/1963  Karalus........................... 428/343 X Primary Examiner—Harris A. Pitlick
Attorney, Agent, or Firm—Sughrue, Rothwell, Mion, Zinn and Macpeak

[57] ABSTRACT

An adhesive tape comprising a support, a magnetic layer provided on one side of the support, the other side of the support being provided with an undercoating layer or having been subjected to a surface treatment in order to increase the adhesion of the support to a photographic emulsion layer, and an adhesive layer provided on the magnetic layer. The adhesive tape is used to join photographic supports.

15 Claims, 3 Drawing Figures

ADHESIVE TAPE

BACKGROUND OF THE INVENTION

1. Field of the Invention

The present invention relates to an adhesive tape for joining webs. More particularly, the present invention is concerned with an adhesive tape for joining photographic supports using high frequency heating.

2. Description of the Prior Art

The term "high frequency" as used herein designates alternating waves of frequencies of several MHz or more.

In the continuous production of a photographic light-sensitive member, long, flexible photographic supports (hereinafter referred to as "webs") are joined to each other and the resulting endless support is passed continuously through a series of processing stations, the surface of the running support being coated with a photographic light-sensitive material, and then dried and wound up.

Various methods are known for joining such webs, and of these methods, joining by the use of an adhesive tape is widely used.

However, the glue joints of webs joined with an adhesive tape are thick as compared with the other areas, and therefore, if the glue joints are left as they are, the following problems occur:

1. Where the clearance between a coating device and the web, as in the case of bead coating, is extremely small, it is impossible for the joint to pass the coating unit;
2. Even if the joint can pass the coating unit, uncoated areas and extremely thickly coated areas are formed on the surface of the web at the rear side of the joint, or stripes are formed on the coating film for a considerable length behind the joint (which are due to air bubbles); and
3. Even if coating is successfully carried out, the joints strongly press against adjacent webs when the web is wound up, and thus pressure fog is liable to result.

To overcome these problems, it is essential to detect the position of a joint, at least during production, because:

1. By knowing the position of a joint, it is possible to enlarge the clearance between the coating apparatus and the web when the joint passes through the coating unit. As a result, the joint passes smoothly through the coating unit;
2. Even if the position of the joint is known, it is impossible to avoid uneven coating, etc., behind the joint. However, it is possible to cut off all unsuitable areas including the joints prior to winding by detecting the position of the joint; and
3. Since the joint can be cut off prior to winding by knowing the position of the joint, there is no danger of pressure fog.

Accordingly, an adhesive tape comprising an aluminum film (hereinafter, "aluminum tape") which can be easily detected, has heretofore been used as a tape for joining webs.

FIG. 1 shows a sectional view of the aluminum tape hitherto used, wherein 1 is an undercoating layer, 2 is a support, 3 is an aluminum layer, 4 is an adhesive layer, and 5 is a release paper. The aluminum layer 3 is produced by depositing an extremely thin aluminum film on support 2, and the release paper 5 is peeled off the adhesive layer 4 at the time of use.

The conductivity of such an aluminum tape itself is high, and eddy currents easily flow therein. Thus, for example, a joint can be detected by a change in the magnetic flux resulting when two webs joined by the aluminum tape pass a magnetic head. Furthermore, this detection method does not deteriorate the quality of a photographic film. For these reasons, aluminum tape has commonly been used in the field of producing photographic supports.

Recently, however, requirements for rapidly drying web coatings on photographic light-sensitive members to increase production efficiency have increased.

As one such rapid drying method, drying by high frequency heating as described in U.S. Pat. No. 3,491,457 and Japanese Patent Laid Open No. 81953/1974 (hereinafter referred to as "high frequency drying") has been proposed.

This high frequency drying is usually carried out by simultaneously irradiating with high frequency irradiation, 915 MHz or 2450 MHz, and blowing a high velocity gas stream on the web. The apparatus for this processing is provided with a waveguide and a gas nozzle, and the web is subjected to high frequency irradiation and to the high velocity gas stream when it passes between the slits of the waveguide. Since such high frequency drying dries the web uniformly and rapidly while maintaining the surface of the web at a suitable temperature, the use of such high frequency drying for photographic light-sensitive materials is increasing.

It is known, however, when a metallic material of high conductivity is placed in a high frequency electric field, a spark or local current occurs between the drying apparatus and the metallic material, resulting in development of localized increased temperature areas in the metallic material and a burning of the metallic material. Since aluminum tape has a thin aluminum film of extremely high conductivity, the aluminum tape sparks with the drying apparatus in a high frequency electric field and is burned. As a result, not only is the strength of the joint decreased, but serious problems such as fogging of the photographic light-sensitive member due to sparking result. Thus, it has been difficult to use high frequency drying to dry photographic materials comprising webs joined by aluminum tape.

SUMMARY OF THE INVENTION

The object of the present invention is to provide a novel adhesive tape for joining webs, which is free from the above-described defects of prior art aluminum tapes, can be used in high frequency drying, and which enables the position of a joint to be detected.

This object is preferably attained by providing on the back of a support which has an undercoating layer to increase adhesion to a photographic emulsion layer, or which has been subjected to surface treatment, a magnetic layer and an adhesive layer, in this order.

DETAILED DESCRIPTION OF THE INVENTION

An adhesive tape provided with a magnetic layer as described above (hereinafter, for purposes of simplicity, referred to as "magnetic tape") is lower in conductivity than aluminum tape, and thus, the magnetic tape is suitable for high frequency drying. Furthermore, as the magnetic tape is high in permeability, it is easy to detect the position of a joint. The details will be explained below.

The following deals with a preferred embodiment of the invention. In practice, it is possible to utilize a magnetic tape in accordance with the present invention which comprises a support, a magnetic layer which comprises a binder and a ferromagnetic powder and an adhesive layer on the magnetic layer. However, in most instances a release paper will be provided on the adhesive layer to prevent the tapes from adhering to each other when in rolled form and to promote easy handling, and, generally, the support will be activated or provided with an adhesive to insure good adherence of a photographic emulsion layer to the support. Where the support shows adequate adhesion to a photographic emulsion layer, no undercoating is required, however.

Figure 1:
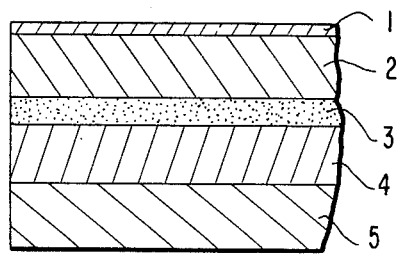
FIG. 1 is a sectional view of an aluminum tape for joining as has hitherto been used.
Figure 2:
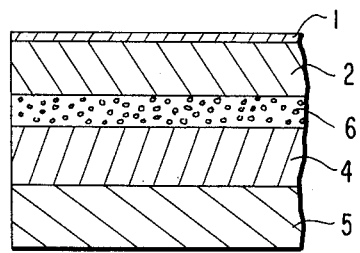
FIG. 2 is a sectional view of an adhesive tape illustrating an embodiment of the present invention.

FIG. 2 shows a sectional view of a magnetic tape, wherein 1 is an undercoating layer providing adhesion to a photographic emulsion layer, 2 is a support, 6 is a magnetic layer comprising a binder, a ferromagnetic powder, and conventional additives, if desired, 4 is an adhesive layer and 5 is a release paper, e.g., Kraft paper.

Support 2 is generally about 5 to 50 $\mu$, preferably 10 to 40 $\mu$, thick, and can be made of a polyester such as polyethylene terephthalate, and the like; a polyolefin such as polypropylene, and the like; cellulose derivatives such as cellulose triacetate, cellulose diacetate, and the like; polycarbonate, or the like.

It should be understood, however, that the above thicknesses are not per se limitative on the support of the present invention, since thinner or thicker supports can be used. As later explained, however, the above thickness range does provide a practical commercial range and such supports are easily available at low price.

One must consider, however, when used to join webs: the thicker the tape, or the higher the coating speed (web running speed), the more pronounced the aforesaid coating defects, e.g., formation of partially thickly coated areas at the rear of joints, etc. Accordingly, an adhesive tape cannot be too thick when the coating speed is high. On the other hand, the adhesive tape (support) may be fairly thick at low coating speeds without any coating defects. Accordingly, the thickness of a support is set upon considering the coating speed desired. In general, when the coating speed is about 10 to 40 m/min, the thickness of the adhesive tape is usually less than 100 $\mu$ and that of the support is usually less than 50 $\mu$.

The lower limit of the thickness of the support is decided mainly upon the mechanical strength required and is usually about 20 $\mu$ or greater regardless of the coating speed.

In order not to cause the aforesaid coating defects at the rear of a joint, several techniques as disclosed in, for example, U.S. Pat. application Ser. Nos. 499,678 (corresponding to Japanese Patent Application (OPI) 43140/75), 502,337 (corresponding to Japanese Patent Application (OPI) 49338/75), and U.S. Pat. No. 3,531,361, can be used. In the case of using such techniques, coating defects are not caused, even at high coating speeds, so long as the thickness of the adhesive tape is less than about 100 $\mu$.

It should further be understood that insofar as the identity of the support is concerned, it is not substantially limited. Supports other than those above can be freely selected so long as, of course, a photographic emulsion layer adequately adheres thereto and, of course, a magnetic layer comprising a binder and a ferromagnetic fine powder can be adhered thereto.

An undercoating layer 1 is conventionally provided by coating an undercoating liquid on the surface of the web to provide good adhesion to the photographic emulsion layer. However, the undercoating layer is provided on the magnetic tape of the present invention for different reasons, i.e., uneven coating, stripes, bubbles, and the like are prevented from occurring at the joint of webs joined by the magnetic tape when the photographic emulsion is coated after joining of the webs. These problems are mainly due to a lack of adhesion between a photographic emulsion and the surface of the adhesive tape, and when adhesion is low, these problems can be avoided by using an undercoating layer. A suitable thickness for the undercoating layer is about 0.01 to about 1 $\mu$, preferably 0.1 to 0.5 $\mu$.

The undercoating liquid used in the magnetic tape includes those conventional undercoating liquids which are used for webs on which a photographic emulsion is coated, without alteration.

The undercoating liquid varies according to the material of the support 2. For example, when the support 2 is a polyester such as polyethylene terephthalate, those undercoating liquids disclosed in U.S. Pat. Nos. 3,143,421, 3,615,556 and Japanese Patent Applications (OPI) 89979/73, 44079/74 and Japanese Patent Publication No. 12433/72, etc., can be most profitably used in the present invention.

On the other hand, where the support 2 is made of a cellulose derivative such as cellulose triacetate, dispersions of gelatin in organic solvents such as acetone, methanol, methylene chloride, and the like, those undercoating liquids as described in U.S. Pat. Nos. 2,133,110, 2,271,228, 2,461,467, 2,776,219, 2,939,806, 3,501,300, British Pat. Nos. 465,134, 558,921, 799,184, 862,205, 990,477, West German Pat. Nos. 1,040,898, 1,148,077, 1,447,566, 1,547,820, Japanese Patent Publication No. 13826/1968, Japanese Patent Laid Open No. 26124/1973, etc., are used.

The magnetic layer 6 comprises a binder, a ferromagnetic powder, and conventional additives, if desired, etc.

Essentially, the magnetic layer of the present invention is conventional, i.e., conventional binder, ferromagnetic powders and additives are used in conventional amounts and no novelty is attached to the exact identity of the magnetic layer per se.

As the binder for use in the magnetic substance layer 6, known thermoplastic resins, thermosetting resins, resins, and mixtures thereof can be used.

Suitable thermoplastic resins are those resins which have a softening point of about 150°C or less, an average molecular weight of about 10,000 to 200,000, and a polymerization degree of about 400 to 500, such as a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-silicone resin, a nitrocellulose-polyamide resin, polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, nitrocellulose, and the like, a styrene-butadiene copolymer, a polyester resin, a chlorovinyl ether-acrylate copolymer, an amino resin, various synthetic rubber based thermoplastic resins such as polybutadiene, polychloroprene, polyisoprene, a styrene-butadiene copolymer and the like, mixtures thereof, etc.

Such resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1972, etc.

The thermosetting resins have a molecular weight of about 200,000 or less as a coating solution, but when heated after coating and drying, the molecular weight essentially becomes infinite due to reactions such as condensation, addition, and the like. Of such resins, preferred resins are resins which do not soften or melt before thermal decomposition. Representative examples of such resins are a phenol resin, an epoxy resin, a polyurethane hardening type resin, e.g., a polyester polyurethane (reaction product of ethylene glycol adipate and metaxylylene diisocyanate, molecular weight: about 30,000), a urea resin, a melamine resin, an alkyd resin, e.g., a modified alkyd resin (reaction product of phthalic acid and glycerin modified with a non-drying oil; oil length: 25%; hydroxy value: about 160 to about 180), a silicone resin, an acrylic based resin, an epoxy-polyamide resin, a mixture of a high molecular weight polyester resin and an isocyanate prepolymer, a mixture of a methacrylate copolymer and a diisocyanate prepolymer, a mixture of a polyester-polyol (e.g., a condensation product of adipic acid and butanediol, having terminal hydroxy groups, molecular weight: about 1,800) and a polyisocyanate, a urea-formaldehyde resin, a mixture of a low molecular weight glycol, a high molecular weight diol and triphenylmethane triisocyanate, a vinyl chloride-vinyl acetate-vinyl alcohol copolymer (molar ratio: 87:11:2; copolymerization degree: 420), a polyamine resin, etc. The above materials can be used alone or as combinations thereof. In addition, isocyanates can be added to such systems as a hardening agent, if desired.

Such resins are described in Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, etc.

The binders can be used alone or as combinations with each other. The binder is blended in an amount of about 10 to about 200 parts by weight per 100 parts by weight of the ferromagnetic powder.

As the ferromagnetic powder used in the magnetic layer 6, $CrO_2$, $\gamma\text{-}Fe_2O_3$, Co containing $\gamma\text{-}Fe_2O_3$, $Fe_3O_4$, Co containing $Fe_3O_4$ (Co content = 1 to 15 atomic % when Co is present in $\gamma\text{-}Fe_2O_3$ and $\gamma\text{-}Fe_3O_4$), Co-Ni-P alloy, Co-Ni-Fe alloy, Fe-Ni-Zn alloy, Fe-Mn-Zn alloy, Fe-Co-Ni-Cr alloy, Fe-Co-Ni-P alloy, Ni-Co-alloy, and other well known ferromagnetic powders can be used, e.g., Co-Ni-P (65:30:5), Co-Ni-Fe (60:10:30), Fe-Ni-Zn (70:25:5), Fe-Mn-Zn (90:5:5), Fe-Co-Ni-Cr (65:15:15:5), Fe-Co-Ni-P (70:15:10:5) and Ni-Co (70:30) are especially preferred (all ratios are atomic ratios).

Such ferromagnetic powders are described in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, U.S. Pat. Nos. 3,026,215, 3,031,341, 3,100,194, 3,242,005, 3,389,014, British Pat. Nos. 752,659, 782,762, 1,007,323, French Pat. No. 1,107,654, West German Patent Laid Open (OLS) No. 1,281,334, etc.

The particle size of the ferromagnetic powder is preferably about 0.2 to about 2 microns in length and about 1/1 to about 2/1 in length/width ratio.

Into the magnetic layer can be added, in addition to the binder and ferromagnetic powder additives such as dispersing agents, if desired.

The dispersing agent, while optional, will generally be used in commercial production due to the fact that it renders dispersion of the ferromagnetic powder in the binder much easier. The exact dispersing agent selected is not overly critical and it can be freely selected from those conventionally used in the art to form magnetic layers. The following examples are merely a recitation of most preferred conventionally used dispersing agents, and are not to be considered as a limitation upon the present invention.

Suitable dispersing agents are fatty acids containing about 12 to 18 carbon atoms (e.g., having the formula $R_1COOH$ wherein $R_1$ is an alkyl group containing about 11 to 17 carbon atoms), e.g., caprylic acid, capric acid, lauric acid, myristic acid, palmitic acid, stearic acid, oleic acid, eladic acid, linolic acid, linolenic acid, stearolic acid, and the like; metallic soaps comprising an alkali metal (Li, Na, K, etc.) salt or an alkali earth metal (Mg, Ca, Ba, etc.) salt of the above described fatty acids; lecithin, etc. In addition, higher alcohols containing about 12 or more carbon atoms and the sulfates thereof can be used. The dispersing agent is preferably added, when used, in an amount of about 1 to 20 parts by weight per 100 parts by weight of the binder.

Since magnetic layer 6 contains, as described above, a fine powder of a ferromagnetic substance such as Fe, Ni, Co, etc., its permeability is high, and since the magnetic layer 6 generally contains, in addition to the ferromagnetic powder and binder, conventional additives, its electric resistance is high, and thus, its conductivity is low. Therefore, a magnetic tape with magnetic layer 6 can be effectively detected with a joint detecting apparatus in which a change in the magnetic flux is detected. Further, since electricity flows in the magnetic tape only with difficulty because of its low conductivity, no sparking or formation of local current, etc., occurs in a high frequency heating apparatus.

As methods of coating the above-described magnetic layer 6 on the support 2, air doctor coating, blade coating, air knife coating, squeeze coating, dip coating, reverse roll coating, transfer roll coating, gravure coating, kiss coating, cast coating, spray coating, and the like can be used. Of course, other coating methods can be used. These coating methods are described in detail in *Coating Kogaku* (*Coating Engineering*), pages 253 to 277, published by Asakura Shoten, Tokyo (Mar. 20, 1971).

As organic solvents for use in coating magnetic layer 6, ketones such as acetone, methyl ethyl ketone, methyl isobutyl ketone, cyclohexanone, and the like; alcohols such as methanol, ethanol, propanol, butanol, and the like; esters such as methyl acetate, ethyl acetate, butyl acetate, ethyl lactate, glycol acetate monoethyl ether, and the like; glycol ethers such as ether, glycol methyl ether, glycol monoethyl ether, dioxane, and the like; aromatic hydrocarbons such as benzene, toluene, xylene, and the like; chlorinated hydrocarbons such as methylene chloride, ethylene chloride, carbon tetrachloride, chloroform, ethylene chlorohydrine, dichlorobenzene, and the like, etc., can be used.

Magnetic layer 6 coated on support 2 by a method as described above is, if desired, subjected to orientation, and then dried. Orientation can be in a magnetic field over 300 Gauss as disclosed in Japanese Patent Publication Nos. 4634/1958, 13931/1962, 23624/1965, 23625/1965, 2065/1966, and Japanese Patent Application (OPI) 14307/1975, etc., and drying can be by blowing 1 – 10 m/sec of air at 40° to 140°C as disclosed in Japanese Patent Publication Nos. 14389/1965, 20838/1966, 32006/1972, 32007/1972, and Japanese Patent Applications (OPI) 53631/1974, 59173/1974, 114402/1974, 6307/1975, 10337/1975, 26505/1975, etc.

The magnetic layer 6 is more easily broken as the thickness of the layer increases, and the permeability of the magnetic tape itself lowers as the thickness of the layer decreases, i.e., since the magnetic layer 6 is a solid layer comprising a ferromagnetic powder and is provided on a flexible support 2, when the magnetic tape is bent, the magnetic layer 6 follows the support 2 with more difficulty as the thickness of the magnetic layer 6 increases, as a result of which the magnetic layer 6 is more easily breakable at increased thickness.

On the other hand, as the thickness of the magnetic layer 6 decreases, the ferromagnetic powder density in the magnetic layer 6 in the thickness direction becomes smaller, and thus, the permeability of the magnetic tape itself decreases.

Taking into account these contradictory requirements, the thickness of the magnetic layer 6 is normally about 3 to about 30 $\mu$, preferably about 5 to about 20 $\mu$, and most preferably 8 to 12 $\mu$.

Adhesive layer 4 is formed by coating a conventional pressure-sensitive adhesive containing a rubber such as natural rubber, butadiene-styrene copolymer rubber, butadiene-acrylonitrile copolymer rubber, neoprene rubber, or the like; one or more solvents selected from benzene, toluene, xylene, methyl ethyl ketone, and methanol; plus a vinyl monomer such as acrylic acid, methacrylate, acrylonitrile, styrene, or the like. However, the present invention is not limited to these pressure-sensitive adhesives, and heat-sensitive adhesives comprising polymers such as polystyrene, polymethacrylate, polyvinyl chloride, and the like can be used. Further, useful pressure-sensitive adhesives are disclosed in, for example, U.S. Pat. Nos. 3,491,877, 3,565,247, etc.

When a magnetic tape comprising a pressure-sensitive adhesive is used to join a plurality of webs, the webs are merely joined by butting the webs (the webs are not generally overlapped) and thereafter pressing the face of the adhesive against the joint. On the other hand, where a magnetic tape comprising a heat-sensitive adhesive is used, the webs are again merely butted, the heat-sensitive adhesive layer contacted therewith and thereafter the joint heated to activate the adhesive. For instance, a temperature on the order of 100° to 140°C, preferably 110° to 130°C, is used in the case of using a polyester as a heat-sensitive adhesive. A suitable thickness for the adhesive layer is about 5 to about 40 $\mu$, preferably about 15 to about 30 $\mu$.

As release paper 5, anchor coated Kraft paper can be used, and in addition, silicone treated glassine paper, parchment paper, and the like can be used. The release paper 5 is provided to prevent contamination due to adhesion of the adhesive layer 4 to the apparatus and so on, and for ease of handling, as well as preventing adhesion of the adhesive layer 4 to the undercoating layer 1 upon winding the magnetic tape in roll form.

The total thickness of the magnetic tape according to the present invention is usually determined experimentally, because excessively thick magnetic tapes cause problems in coating the photographic emulsion and in the winding of the web, whereas excessively thin magnetic tapes decrease the strength of the magnetic tape itself, thereby decreasing the strength of the joint. The total thickness of the adhesive tape according to the present invention ranges from about 20 to about 100 $\mu$, preferably about 30 to about 80 $\mu$, most preferably about 40 to about 60 $\mu$. In general, good commercial operation is most conveniently obtained with a total thickness of about 50 $\mu$.

Factors to be considered in determining the total thickness of the adhesive tape include: (i) Restrictions on the production mode of the adhesive tape: (a) after production of the adhesive tape, no wrinkling should be caused upon reeling the adhesive tape; (b) when coating the adhesive layer, the lower limit of the thickness thereof is set in the coating step per se while the upper limit is decided by the economy of drying; (ii) Restriction upon coating: as earlier discussed plus the clearance between the coating device and the web; (iii) Restriction on winding: after coating, the web is reeled. At this time, pressure fog can be caused when the adhesive tape is thick (this is not such an important factor since the joint of the web is generally cut at the winding stage).

It goes without saying that the present invention is not limited to the above-described embodiments, and that various modifications and alterations can be made without departing from the spirit of the present invention.

For example, while undercoating layer 1 is shown provided on the support 2 to give good adhesion between a photographic emulsion layer and the support 2 in the embodiment described above, the undercoating layer is not necessarily required if the above object can be attained by other means. For example, with a support 2 made of a polyester, a method using surface treatment such as a mechanical treatment (mechanically roughening), a corona discharge, a flame treatment, ultraviolet irradiation, a high frequency irradiation, glow discharge, active plasma treatment, irradiation with a laser beam, contact with a mixed acid (e.g., chromic acids), ozone oxidation treatment, and the like can be used, and then the photographic emulsion directly coated thereon. The same results as in the earlier embodiment are obtained. Suitable surface treatments are disclosed in U.S. Pat. Nos. 3,072,483, 3,145,242, 3,349,703, 3,520,583, 3,761,299, 3,853,585 and 3,867,167.

Furthermore, although a release paper is used in the above embodiment, it is merely provided for ease of handling the magnetic tape. Therefore, if handling is carried out carefully, such a release paper is not necessary.

In the above embodiment, magnetic layer 6 is provided between the support 2 and the adhesive layer 4, but as will be apparent from the above, the position of the magnetic layer 6 is not necessarily limited. Thus, the magnetic layer 6 can be directly provided on the surface of the support 2. In this case, however, there is the danger that the magnetic powder contained in the magnetic layer 6 will be spattered during the running of the web, which is not desired.

As methods of detecting the position of the joint of the webs joined by the magnetic tape of the present invention, conventional methods and apparatus utilizing the change in flux of a magnetic field can be used without modification.

Figure 3:
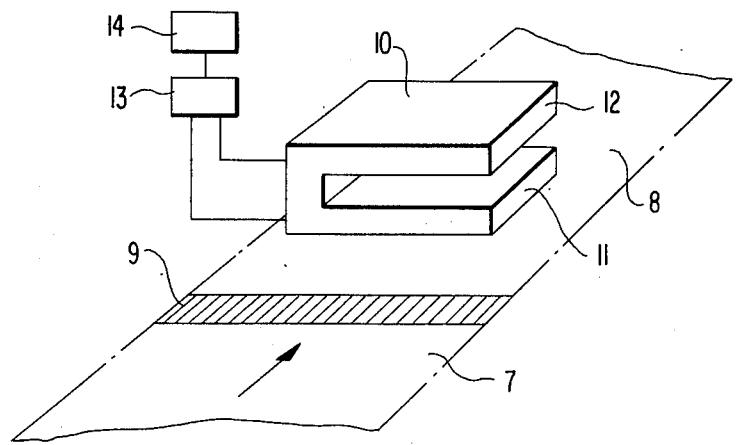
FIG. 3 shows one embodiment of apparatus for detecting a joint in a web joining using the adhesive tape of the present invention.

FIG. 3 shows one embodiment of such apparatus. Joint 9 of webs 7 and 8 joined by the magnetic tape of the present invention is conveyed in the direction of the arrow. When the joint 9 passes between the generating coil 11 and the receiving coil 12, a change in magnetic flux is caused, which results in a signal being transmitted to controlling unit 13, thereby operating the driving unit 14 which, in general, initiates the apparatus so as to wind up the adhesive tape.

It will be appreciated by one skilled in the art that while only four high frequencies, i.e., 915 MHz, 2,450 MHz, 5,800 MHz, and 22,125 MHz, are defined in the Japanese Industrial Standards (JIS), "high frequency" as is used herein is not be limited to the above frequencies, and those of about 900 to about 30,000 MHz are of use for drying.

Further, in the present invention commonly air is used as the drying gas, but $N_2$, noble gases and others inert to the photographic emulsion can be used. Most preferred drying conditions involve blowing the gas onto the web as a high velocity gas stream at 1 to 50 m/sec, preferably 2 to 40 m/sec, particularly preferably 10 to 30 m/sec, at an amount of 1.8 to 90 $m^3/m^2$min, preferably 3.6 to 72 $m^3/m^2$min, most preferably 18 to 54 $m^3/m^2$ min.

The present invention will now be described in more detail by reference to several examples.

EXAMPLE 1 AND COMPARISON EXAMPLE 1

Comparison

Onto the surface of a 20 $\mu$ thick polyethylene terephthalate film support there was provided an undercoating layer (0.2 $\mu$ dry thickness) of the ingredients shown in Table 1, and on the back of the support, a 600 A thick aluminum layer was vapor-deposited and an adhesive layer (20 $\mu$ dry thickness) comprising an acrylate based pressure-sensitive adhesive in this order to produce an aluminum tape of the total thickness of 40 $\mu$ and a width of 50 mm; all coated layers were formed by bar coating using a coating roll and removing excess solution with a wire winding bar.

The adhesive was produced as follows: 2 parts by weight of natural rubber was dissolved in 60 parts by weight of toluol to produce a 25% (gum concentration) gum solution, then 2 parts by weight of methyl methacrylate and 0.1 kg of acrylonitrile were mixed therewith. In addition, to the thus obtained solution, 0.4 wt% of benzoyl peroxide and 0.7 wt% of lauroyl peroxide based on the monomer (i.e., the mixture of methyl methacrylate and acrylonitrile) were added while stirring at 95°C to polymerize (the thus obtained polymer consisted of 88 – 90% graft polymer and 10 – 12% polymethyl methacrylate homopolymer; graft: 75 – 82%). To this polymer solution, 1.8 parts by weight of a thermoplastic pentene resin, 0.15 part by weight of zinc oxide and 0.06 part by weight of trimethylthiuramdisulfite were dissolved to produce the adhesive (see Japanese Patent Publication No. 1472/1962, Example 1).

EXAMPLE

A magnetic tape was formed as above except that in place of the aluminum layer of the above aluminum tape, a 10 $\mu$ thick magnetic layer composed of the ingredients shown in Table 2 was provided to produce a magnetic tape of a total thickness of 50 $\mu$ and a width of 50 mm.

TABLE 1

|  | Parts by weight |
| --- | --- |
| Gelatin | 1 |
| Water | 2 |
| Monochloro Acetic Acid | 2 |
| Phenol | 5 |
| Methanol | 35 |
| Methylene Chloride | 57 |

TABLE 2

|  | Amount (g) |
| --- | --- |
| $Fe_2O_3$ (size: 1 $\mu$ × 0.2 $\mu$) | 300 |
| Vinyl Chloride-Vinyl Acetate Copolymer (molar ratio: 83:17, degree of polymerization: 420) | 70 |
| Butyl Acrylate | 20 |

The thus obtained two tapes were subjected to high frequency waves of 2450 or 915 MHz to determine their suitability for high frequency heating.

A. Using the aluminum tape and the magnetic tape produced above, 80 $\mu$ thick and 1,000 mm wide polyethylene terephthalate webs were joined. The thus joined webs were introduced into a 2450 MHz high frequency oscillator, in which high frequency waves of an output of 1 kw were applied onto the webs for 30 seconds, 1 minute, 2 minutes, 5 minutes, or 10 minutes, respectively, while blowing air at a velocity of 3 m/sec and a temperature of 26°C thereon.

As a result, as shown in Table 3, the aluminum tape burned immediately due to spark discharge, whereas the surface temperature of the magnetic tape remained at about 31°C, and the magnetic tape was not damaged.

TABLE 3

| Conditions | | Aluminum Tape | Magnetic Tape (surface temp.) |
| --- | --- | --- | --- |
| Output: 1 kw; | 30 sec | immediately burned | 29°C |
| " | 1 min |  | 30°C |
| " | 2 min |  | 31°C |
| " | 5 min |  | 31°C |
| " | 10 min |  | 31°C |

B. The above webs were placed in a 915 MHz high frequency oscillator in which they were processed under the conditions shown in Table 4 without blowing air heated thereon.

As a result, as shown in Table 4, with the aluminum tape the same results as above were obtained, whereas the magnetic tape was not damaged, though its surface temperature increased to 35° and 60°C.

TABLE 4

| Conditions | Aluminum Tape | Magnetic Tape (surface temp.) |
| --- | --- | --- |
| Output: 10 kw; 10 sec | immediately burned | 35°C |
| Output: 20 kw; 10 sec | same | 60°C |

EXAMPLE 2

An aluminum tape and a magnetic tape as in Example 1 were used to join webs. The webs so joined were run between a generating coil 11 and a receiving coil 12 of a detecting apparatus 10 as shown in FIG. 3 at a speed of 80 m/minute to detect the joints of the webs. The output signal to noise ratio, i.e., S/N ratio, of an amplifier provided on controlling unit 13, for the aluminum tape was 36.3 dB and for the magnetic tape was 35.6 dB. While the magnetic tape showed a somewhat smaller value than the aluminum tape, the joint of the webs joined with the magnetic tape was positively detected without error.

As is apparent from the above description, the present invention provides the following novel effects:

1. The magnetic tape of the present invention is low in conductivity, and thus is free from substantial heating and burning due to high frequency induction currents. Therefore, the magnetic tape of the present invention can be used for joining webs by high frequency heating.
2. Since the permeability of the magnetic tape of the present invention is high, heretofore used apparatus for detecting momentary changes in the magnetic flux can be used to detect the joint of the webs without modification.

While the invention has been described in detail and with reference to specific embodiments thereof, it will be apparent to one skilled in the art that various changes and modifications can be made therein without departing from the spirit and scope thereof.

What is claimed is:

1. An adhesive tape for use in joining photographic supports which are dried using high frequency radiation, said adhesive tape comprising a support, a magnetic layer on one side of said support, the other side of said support showing adhesion to a photographic emulsion layer, and an adhesive layer on said magnetic layer.
2. The adhesive tape according to claim 1, wherein an adhesive undercoating layer is provided on said other side of said support to increase adhesion to said photographic emulsion layer.
3. The adhesive tape according to claim 1, wherein said support has been subjected to a surface treatment to increase adhesion to said photographic emulsion layer.
4. The adhesive tape according to claim 1, wherein the thickness of the support is about 5 to about 50 $\mu$.
5. The adhesive tape according to claim 1, wherein the thickness of the support is about 10 to 40 $\mu$.
6. The adhesive tape according to claim 1, wherein the support is made of a material selected from the group consisting of polyesters, polyolefins, cellulose derivatives, and polycarbonates.
7. The adhesive tape according to claim 1, wherein the magnetic substance comprises a binder and a ferromagnetic powder.
8. The adhesive tape according to claim 7, wherein the binder is selected from the group consisting of thermoplastic resins, thermosetting resins and mixtures thereof.
9. The adhesive tape according to claim 7, further comprising a dispersing agent.
10. The adhesive agent according to claim 9, wherein the dispersing agent is added in an amount of about 1 to 20 parts by weight per 100 parts by weight of the binder.
11. The adhesive tape according to claim 1, wherein the thickness of the magnetic layer is about 3 to 30 $\mu$.
12. The adhesive tape according to claim 1, wherein the thickness of the magnetic layer is about 5 to 20 $\mu$.
13. The adhesive tape according to claim 1, wherein the adhesive is a pressure-sensitive adhesive.
14. The adhesive tape according to claim 1, wherein a release paper is placed on the adhesive layer.
15. An adhesive tape for use in joining photographic supports which are dried using high frequency radiation, said adhesive tape comprising a support, a magnetic layer on one side of said support, the other side of said support showing adhesion to a photographic emulsion layer, an adhesive layer on said magnetic substance layer, and a release paper on said adhesive layer.

* * * * *